US008560115B2

(12) United States Patent
Van Gorp et al.

(10) Patent No.: US 8,560,115 B2
(45) Date of Patent: Oct. 15, 2013

(54) METHOD AND SYSTEM FOR TRACKING MAIL ITEMS DURING PROCESSING

(71) Applicant: Bell and Howell, LLC, Durham, NC (US)

(72) Inventors: Mark Van Gorp, Cary, NC (US); John Keirsbilck, Rochester, NY (US); Walter S. Conard, Lake Villa, IL (US)

(73) Assignee: Bell and Howell, LLC, Durham, NC (US)

( * ) Notice: Subject to any disclaimer, the term of this patent is extended or adjusted under 35 U.S.C. 154(b) by 0 days.

(21) Appl. No.: 13/849,843

(22) Filed: Mar. 25, 2013

(65) Prior Publication Data

US 2013/0218327 A1 Aug. 22, 2013

Related U.S. Application Data

(62) Division of application No. 12/781,412, filed on May 17, 2010, now Pat. No. 8,433,438.

(60) Provisional application No. 61/178,653, filed on May 15, 2009.

(51) Int. Cl.
*B07C 5/00* (2006.01)
*B07C 3/00* (2006.01)
*G06F 7/08* (2006.01)

(52) U.S. Cl.
USPC ....... 700/221; 270/52.02; 270/1.02; 700/215; 700/225; 700/226; 700/227; 700/223

(58) Field of Classification Search
USPC .............. 270/1.02, 52.02; 700/215, 220, 221, 700/223, 224, 225, 226, 227
See application file for complete search history.

(56) References Cited

U.S. PATENT DOCUMENTS

| | | |
|---|---|---|
| 5,239,168 A | 8/1993 | Durst, Jr. et al. |
| 5,422,821 A | 6/1995 | Allen et al. |
| 5,454,038 A | 9/1995 | Cordery et al. |
| 5,682,429 A | 10/1997 | Cordery et al. |
| 5,703,783 A | 12/1997 | Allen et al. |
| 5,781,634 A | 7/1998 | Cordery et al. |
| 5,819,240 A | 10/1998 | Kara |
| 5,953,427 A | 9/1999 | Cordery et al. |
| 6,064,993 A | 5/2000 | Ryan, Jr. |
| 6,370,521 B1 | 4/2002 | Pigos, Jr. et al. |
| 6,865,561 B1 | 3/2005 | Allport et al. |
| 7,702,593 B2 | 4/2010 | Pintsov |
| 7,711,650 B1 | 5/2010 | Kara |

(Continued)

OTHER PUBLICATIONS

United States Office Action issued in U.S. Appl. No. 12/775,731 dated Jul. 25, 2012.

(Continued)

*Primary Examiner* — Leslie A Nicholson, III
(74) *Attorney, Agent, or Firm* — McDermott Will & Emery LLP

(57) ABSTRACT

The present application relates to a system and related method for processing a mailpiece through the steps associated with its manufacture and post processing. The present system and method allow for mailpiece item tracking data collection at each step in the mailpiece manufacturing and processing. The present system and method allow for the integration of mailpiece item data from a postage device by utilizing information based barcode data included as part of the postage evidence, together with the production and sorting processes.

19 Claims, 8 Drawing Sheets

(56) References Cited

U.S. PATENT DOCUMENTS

| | | | |
|---|---|---|---|
| 7,741,575 B2* | 6/2010 | Bowers et al. | 209/584 |
| 8,301,297 B2* | 10/2012 | Bowers et al. | 700/226 |
| 2005/0149765 A1 | 7/2005 | Aldstadt et al. | |
| 2005/0216118 A1 | 9/2005 | Conard et al. | |
| 2006/0108266 A1* | 5/2006 | Bowers et al. | 209/584 |
| 2006/0215937 A1 | 9/2006 | Snapp | |
| 2007/0215705 A1 | 9/2007 | Borja | |
| 2007/0282764 A1 | 12/2007 | Ehresmann et al. | |
| 2008/0091460 A1 | 4/2008 | Paul | |
| 2008/0162381 A1 | 7/2008 | Runstrom et al. | |
| 2009/0057207 A1 | 3/2009 | Orbke et al. | |
| 2009/0157470 A1 | 6/2009 | Rathbun et al. | |
| 2009/0159509 A1 | 6/2009 | Wojdyla et al. | |
| 2010/0106290 A1 | 4/2010 | Isles et al. | |
| 2010/0228387 A1* | 9/2010 | Bowers et al. | 700/226 |

OTHER PUBLICATIONS

United States Office Action issued in U.S. Appl. No. 12/755,731 dated Dec. 7, 2012.

Entire Prosecution History of U.S. Appl. No. 12/781,412, filed May 17, 2010 entitled Method and System for Tracking Mail Items During Processing.

United States Office Action issued in U.S. Appl. No. 12/781,412 dated Aug. 28, 2012.

USPS, intelligent mail barcode Technical resource guide, intelligent mail planning and standards United States Postal Service, Rev. 3.5, Jan. 13, 2009.

* cited by examiner

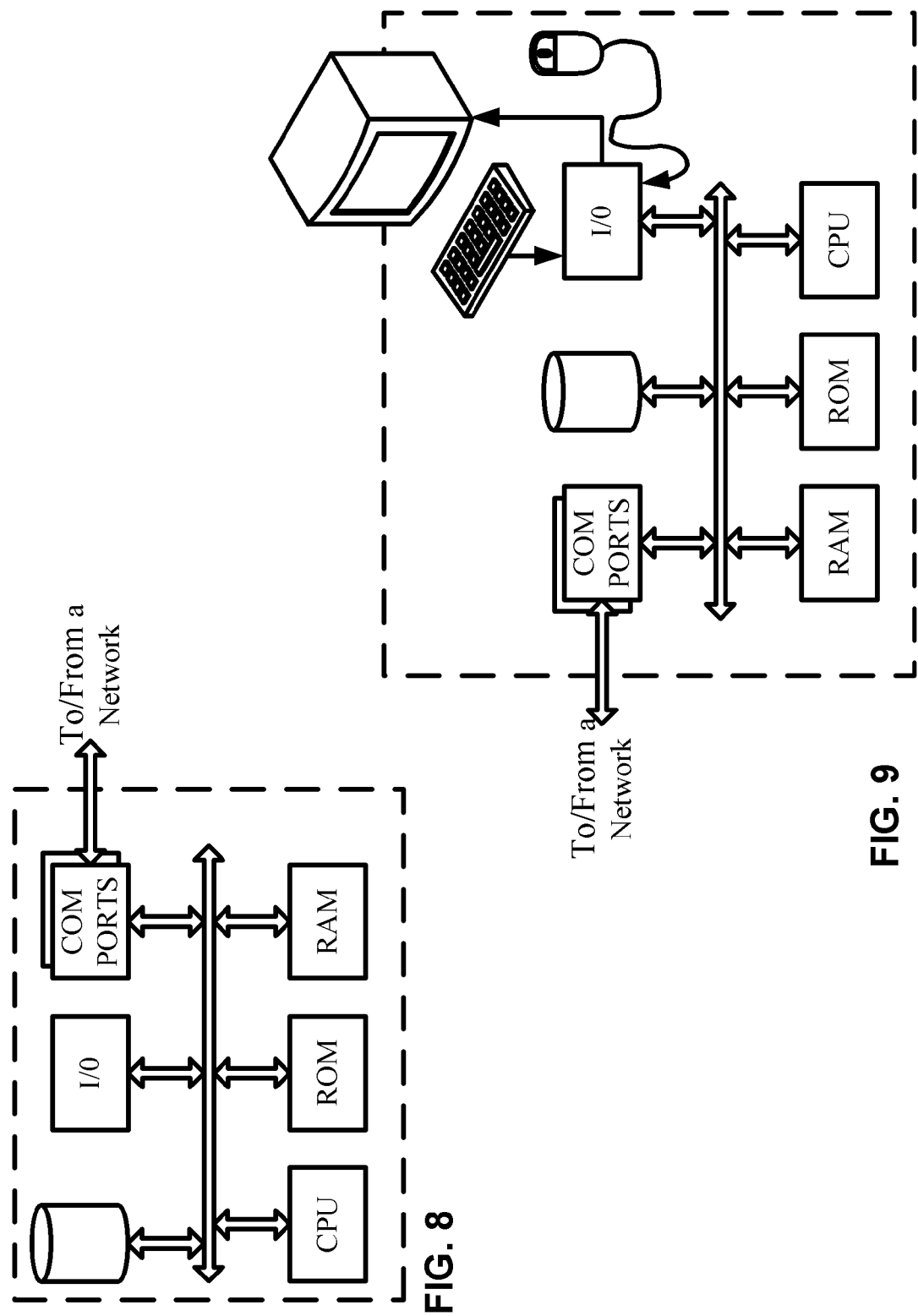

METHOD AND SYSTEM FOR TRACKING MAIL ITEMS DURING PROCESSING

CROSS-REFERENCE TO RELATED APPLICATIONS

This application is a Continuation of U.S. application Ser. No. 12/781,412, filed on May 17, 2010, which claims the benefit of U.S. Provisional Application No. 61/178,653 entitled "METHOD AND SYSTEM FOR ENHANCED SERVICES ON A MAIL PROCESSING SYSTEM" filed on May 15, 2009, the disclosures of which are entirely incorporated herein by reference.

RELATED APPLICATION

This application is related to U.S. application Ser. No. 12/775,731 entitled "METHOD AND SYSTEM FOR IN-LINE ADDRESS QUALITY AND MAIL PREPARATION ON AN INDICIA PRINTING SYSTEM" filed on May 7, 2010, the disclosure of which is entirely incorporated herein by reference.

TECHNICAL FIELD

The present subject matter generally relates to a system and method for tracking a mailpiece through the steps associated with its manufacture and post processing. This includes manufacturing a finished mailpiece with an inserter or wrapper and applying postage indicia with a meter system. Post processing includes sorting the finished mailpieces in accordance with postal authority rules on a mail sorter. Mailpiece item tracking data collection is an integral part of each step in the mailpiece manufacturing and processing.

BACKGROUND

Mailpiece tracking through each stage of manufacturing and post processing up to and including delivery to an addressee has become a business requirement and in some instances, a legal requirement. For example, the Sarbanes-Oxley Act of 2002—'Corporate and Auditing Accountability and Responsibility Act', the HIPAA—Health Insurance Portability And Accountability Act Of 1996 and the UDAP—Unfair and Deceptive Acts or Practices Act, all require data supporting the status of each processing step execution and in some cases proof of mailpiece delivery. Mailpiece item tracking from print through mailpiece manufacture is available with products such as the Bowe Bell+Howell Bowe One system. The creation and tracking of the delivery point barcode such as the USPS® Intelligent Mail® barcode (IMb) are accomplished by the Bowe Bell+Howell NetSort sorter control software.

However, the integration of mailpiece item data from a postage meter, by utilizing the information based barcode data (such as the USPS Information Based Indicia—IBI) included as part of the postage indicia, with the production and sorting processes have not been accomplished. The lack of integration creates a gap in the data collection for each mailpiece about the metering step. Collection of data available from a postage meter associated with indicium applied and integration of mailpiece production data with sorting data and association of this data with the IBI and the delivery point barcode (such as the USPS Intelligent Mail barcode—IMb) is not available. In addition, automatic recognition of a mailpiece and its accumulated item data by a mail sorter is not possible. Furthermore, there is no technique available for a sorter to use the IBI for job setup and mailpiece item data tracking to the correct mailing report or client report. Remote access to mailpiece data is not available by scanning the IBI or IMb.

Hence a need exists for the collection of indicia related data and integration of mailpiece production data with sorting data and the association of this data with the IBI and IMb to be accomplished. Further the use of the IBI to uniquely identify each mailpiece to the sorter control system is required.

SUMMARY

The teachings herein alleviate one or more of the above noted problems with a postage device that is stand alone or integrated on an inserter or wrapper and creates item data that is associated with a unique identifier contained in the postage indicia. This data is transferred to a sorter control system to facilitate sorting operations and continuity of mailpiece item data tracking.

It is desirable to provide a system to process a plurality of mailpieces. The system includes a postage device configured to print postage evidence on each respective mailpiece. The printed postage evidence includes an information based barcode containing a first unique identifier associated with each respective mailpiece. A sorter is included for sorting the mailpieces. The sorter includes an image reading device for reading address data and the first unique identifier from the information based barcode printed on each respective mailpiece. Associated with the postage device, is a first processor configured to collect first parametric data associated with each respective mailpiece. A second processor, which is associated with the sorter, receives the collected first parametric data from the first processor. The second processor is configured to associate each first unique identifier obtained from reading of the information based barcode printed on each respective mailpiece with second parametric data associated with each respective mailpiece collected during sortation of the respective mailpieces on the sorter. The second processor is configured to generate a delivery point barcode containing a second unique identifier for each respective mailpiece. The second processor is further configured to combine the respective first and second parametric data together with the respective first and second unique identifiers for generation of a postal authority report and/or client report.

It is further desirable to provide a method for processing a plurality of mailpieces. The method includes printing postage evidence on each respective mailpiece, wherein the printed postage evidence includes an information based barcode containing a first unique identifier associated with each respective mailpiece. First parametric data associated with each respective mailpiece is collected and transferred to a sorter. The plurality of mailpieces are sorted on the sorter, and during the sorting, address data and the first unique identifier are read from the information based barcode printed on each respective mailpiece. The first unique identifier is associated with second parametric data associated with each respective mailpiece collected during sortation of the respective mailpieces on the sorter. A delivery point barcode containing a second unique identifier is generated for each respective mailpiece. The respective first and second parametric data together with the respective first and second unique identifiers are combined for generation of a postal authority report and/or client report.

It is yet further desirable to provide a system for processing a plurality of mailpieces. The system includes an inserter for manufacturing the plurality of mailpieces. The inserter is configured to collect first parametric data associated with each respective mailpiece during manufacturing on the inserter, and assign a first unique identifier to each respective mailpiece. A postage device is provided for receiving the plurality of mailpieces from the inserter. The postage device is configured to print postage evidence on each respective mailpiece and collect second parametric data from each respective mailpiece as it is processed by the postage device. The printed postage evidence includes an information based barcode containing a second unique identifier associated with each respective mailpiece. A central processor is in operable connection with the inserter and the postage device. The central processor is configured to collect the first and second parametric data and first and second unique identifiers for each respective mailpiece, and transfer the first and second parametric data and first and second unique identifiers for each respective mailpiece to a sorter. The sorter receives the plurality of mailpieces from the postage device and is configured to read the second unique identifier from the information based barcode printed on each respective mailpiece and associate the first and second unique identifiers with third parametric data associated with each respective mailpiece collected during sortation of the respective mailpieces on the sorter. The sorter generates a delivery point barcode containing a third unique identifier for each respective mailpiece. The central processor is configured to combine the respective first, second and third parametric data together with the respective first, second and third unique identifiers for generation of a postal authority report and/or client report.

It is yet still desirable to provide a method of processing a plurality of permit imprinted mailpieces. An information based barcode is printed adjacent to the permit imprint on each respective mailpiece by way of a postage device. The information based barcode includes a first unique identifier for each respective mailpiece. First parametric data is obtained for each respective mailpiece and the first unique identifier and first parametric data are associated for each respective mailpiece. The first unique identifier and first parametric data are transferred for each respective mailpiece from the postage device to a sorter. During sorting on the sorter, each first unique identifier is read from the information based barcode printed on each respective mailpiece. The read first unique identifier and the transferred first parametric data are used for each respective mailpiece to control at least one aspect of sorter operation.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 8 illustrates a network or host computer platform, as may typically be used to implement a server.

FIG. 9 depicts a computer with user interface elements, as may be used to implement a personal computer or other type of work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various components and features disclosed herein relate to specific postal authority processes and requirements. Postage indicium requires that certain data content be printed on a mailpiece such as postage applied, date, origin ZIP code and meter number. Digital postage indicium includes an information based barcode such as but not limited to the Information Based Indicia (IBI) 2-D barcode used by the USPS. If the postage is discounted based on postal authority pre-sort rules for a specific class of mail, this data also is printed as part of the indicia. These postal authority indicia rules change over time. The examples provided herein are not limiting, and the implementation and utilization will be modified as required by those skilled in the art to meet new requirements. The Intelligent Mail® barcode (IMb) referenced herein is an example of the delivery point barcode defined by the USPS. Other barcode formats and data content will be substituted by those skilled in the art as postal authority requirements evolve. The mail sorter, inserter, postage meter, mailpiece layouts and computer/server configurations shown herein are exemplary in nature and are not intended as an implementation limitation.

Figure 1:
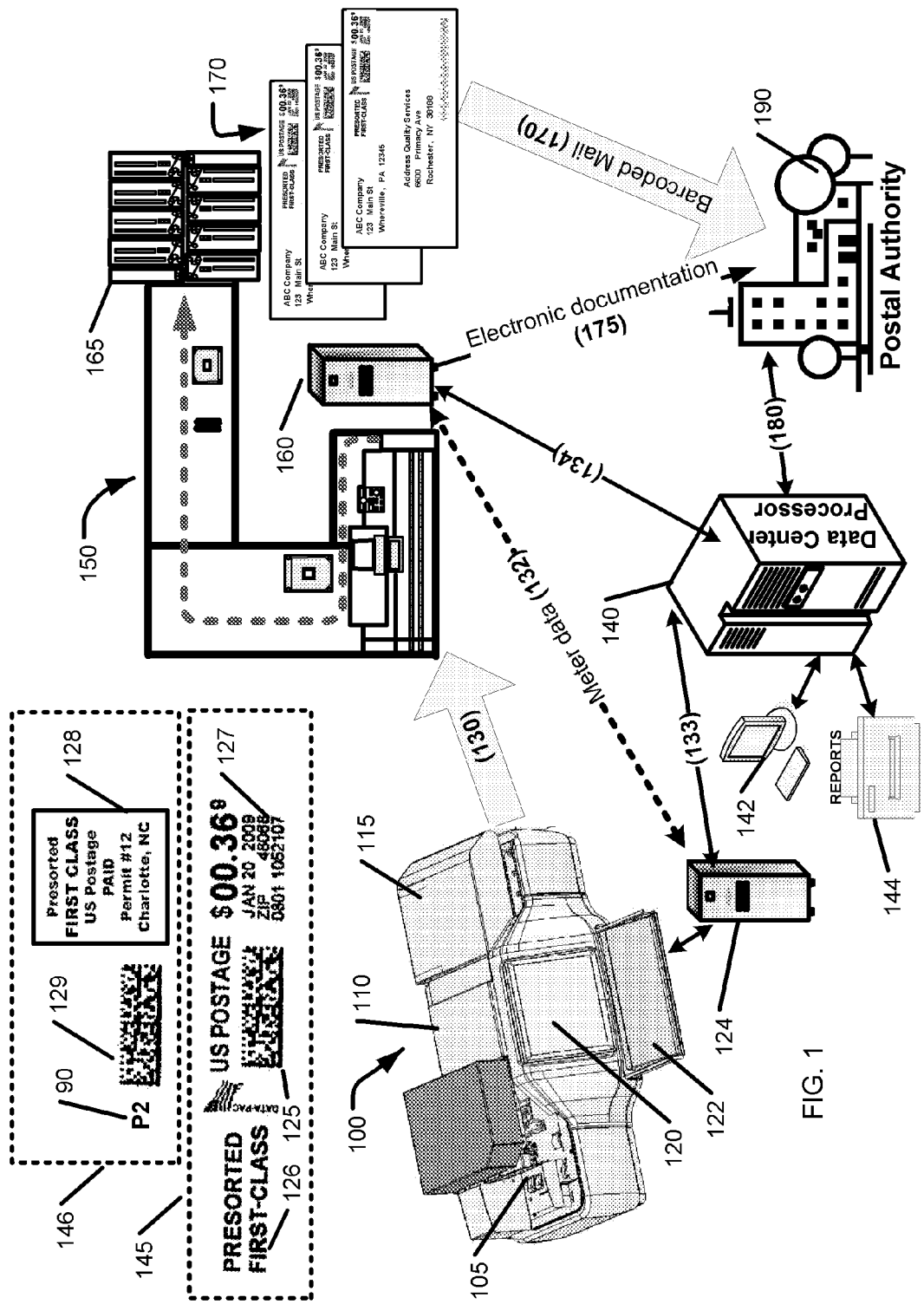
FIG. 1 is an illustration of a system and process to track mailpieces from a postage meter through a mail sorter.

Reference now is made in detail to the examples illustrated in the accompanying drawings and discussed below. FIG. 1 illustrates a system and process to track mailpieces from a postage meter through a mail sorter. A postage device 100, such as a postage meter device or permit imprint device, is used to process mailpieces that are loaded in the feeder 105. If the mail is identical weight, the weight data is loaded into the meter through the keyboard 122 or through the touch screen 120. If the weight is unknown, a scale 110 is used to weigh each mailpiece and associate the weight to postal authority weight category. Each weight category corresponds to the amount of postage required. The first weight category, usually less than one ounce, may be discounted based on expected pre-sort discounts. The class of mail delivery standard (such as but not limited to first class, standard class or non-profit standard class) effects the postage rate tables that must be applied. The printer 115 will apply the postage indicia, either meter data 145 or a permit imprint 146. The meter indicia 127 contains items such as postage applied, date, origin ZIP code and meter number. The Information Based Indicia (IBI) 2-D barcode 125 is printed in accordance with the light format 20 shown in FIG. 3. If the postage is discounted based on postal authority pre-sort rules for a specific class of mail, this data 126 also is printed as part of the indicia. These postal authority indicia rules change over time, and future changes to indicia content and format are contemplated for the present teachings described herein. The permit imprint 128 contains data fields specified by the postal authority and can be preprinted or printed by the meter printer 115. Optionally, an IBI 129 or 425 (FIG. 4) is printed on the mailpiece to facilitate mailpiece tracking and mailpiece data integration. IBI-light 129 contains a postage meter serial number and cycle number with a digital signature, which uniquely and securely identifies the mailpiece just as if it were a postage indicia, only the postage amount in the IBI-light would be $0.000. A mail processing system that has the ability to generate and print a permit imprint and an IBI may not include a PSD to generate a digital signature and still produce an IBI with a unique identifier. In addition, the weight category 90 for each mailpiece may be printed. Weight category will be used by the sorting system to calculate postage due for a mixed weight mailing which contains permit mailpieces. The permit 146 may be printed by a mail processor other than a postage meter provided the IBI requirements are met. The completed mailpieces 130 are staged for processing on the sorter.

The postage device 100 has either an integrated computer or a separate computer 124 that controls the meter, controls indicia printing, receives weight data from the scale, manages operator input, collects meter data associated with every mailpiece that is processed and interfaces with external processors 160, 140. Other processes that are controlled by a postage meter computer are well known by those skilled in the art. Table 1 is a sample of postage meter data, also referred to as first parametric data, stored for each mailpiece by the postage meter system.

TABLE 1

| Postage Meter Data |
|---|
| Client identification |
| Accounting data/postage affixed |
| Date and time processed |
| PSD serial number |
| Postage affixed |
| Class of Mail |
| Operator ID |
| Piece weight |
| Serial piece number/cycle count |
| Range of serial numbers used in job |

Depending on the operational configuration, the meter computer 124 will provide mailpiece and job data 132 to the sorter control computer 160. If multiple postage devices 100 are supplying mailpieces 130 to one or more sorters 150, the preferred architecture is for the postage devices 100 to send the data 133 from the multiple postage meters to a server/data center processor 140. The data 134 required for fulfillment of the production plan is aggregated and forwarded to the one or more sorters 150. The mailpieces 130 are processed in accordance with the system and method described for FIG. 2. Once the sorting process is completed and the mailpieces are sorted to the correct bins 165, the finished mailpieces 170 are swept into mail trays (not shown) from the bins 165 and the mail trays are loaded onto pallets for delivery to the postal authority 190. The sorter computer 160 will compile the data which has been appended to the postage meter data 132, 133 to build a data record for the mailing and for the item data associated with the mailpieces in the mailing.

A mailing is generally defined as a collection of mailpieces from multiple jobs and sources that have been processed in accordance with postal authority rules and are ready to be delivered to the postal authority along with the documentation needed for acceptance by the postal authority. If a single sorter was used, the sorter computer 160 will compile the electronic document 175 needed for acceptance of the mailing. When multiple sorters are used to create a mailing, data 134 from each sorter 150 will be sent to and processed by a data center processor 140. The resulting combined electronic documentation 180 will be sent to the postal authority 190. Hard copy postal and client reports can be printed on a printer 144 or viewed on a display 142 as required. In addition, both the printer 144 and the display 142 can be connected via remote access over a LAN, WAN or internet. With the addition of a barcode scanner (not shown) that can read either the IBI and/or the IMb, individual mailpiece item data can be recalled and printed or displayed.

Figure 2:
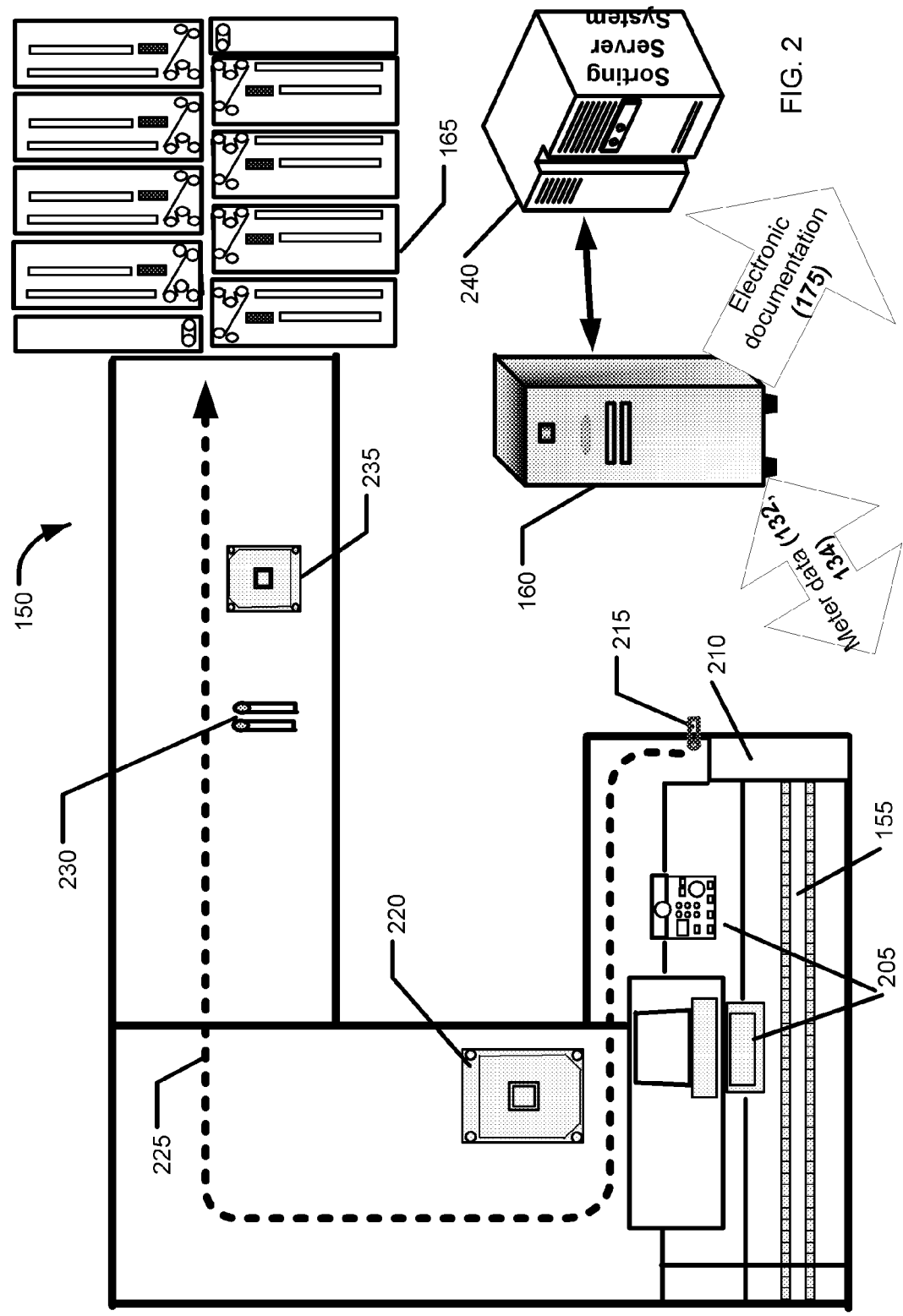
FIG. 2 is an illustration of a sorter system used to interface with a postage meter and process mailpieces with indicia applied by the postage meter.
Figure 3:
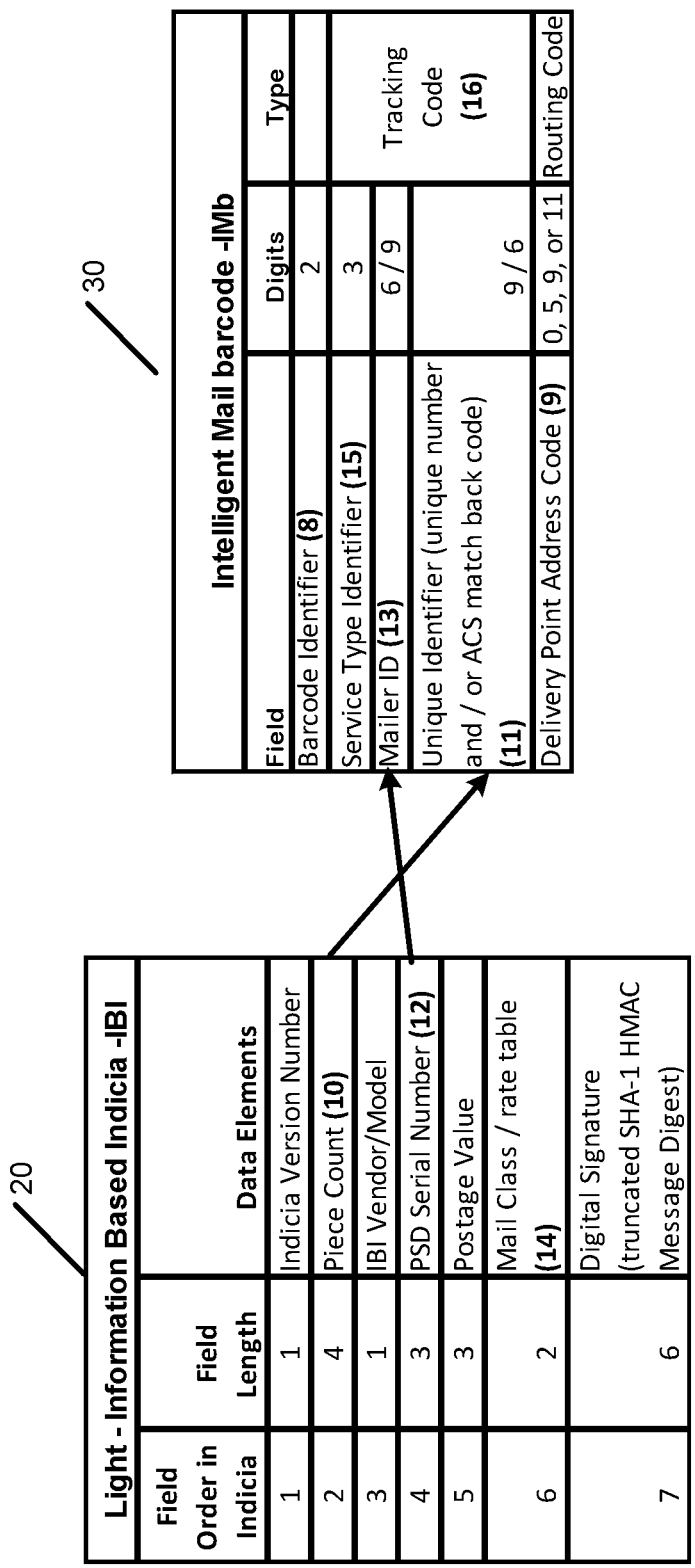
FIG. 3 illustrates the relationship between the Information Based Indicia (IBI) and the Intelligent Mail barcode (IMb) data fields.

Referring now to FIG. 2 for an illustration of a sorter system 150 used to interface with a postage device 100 and process mailpieces with indicia or permit imprints applied by the postage device 100. Before the sorting job is started, meter data 132 for one or more jobs has been received from the postage meter computer 124. Alternatively, the meter data 134 from one or more jobs and one or more postage meters have been received from the data center processor 140 and compiled and forwarded 134 to the sorter computer 160. The meter data is stored in the sorter computer 160 or transferred to the sorting server 240. Depending on the computer architecture the sorter server 240 functions can be integrated into the data center processor 140. Once the data has been received and a sort job(s) has been selected for processing, using the sorter operator interface 205, mailpieces are loaded onto the magazine 155. The mailpiece feeder 210 and transport 225 are started with the control panel 205. The mailpieces in the magazine 155 are singulated by the feeder 210 and fed past the imaging reading device 220. The imaging reading device 220 captures an image of each of the mailpieces with a camera and processes the address and addressee data (410, 505 and 710 shown in FIGS. 4, 5, and 7, respectively). The imaging reading device 220 may include a digital camera or contact image sensor, an illumination element or system and one or more computers to process the image and return a valid delivery point address code 9 (FIG. 3). The address and addressee data is read with an OCR system and looked up in one or more postal authority address quality processes such as but not limited to CASS, DPV, SuiteLink, LACSLink and move update to obtain a delivery point address code 9 (ZIPCODE for the USPS). The IBI (425, 510 and 129 shown in FIGS. 4, 5, and 7, respectively) is read by the imaging reading device 220 to obtain the piece count data 10 (FIG. 3) and Postal Security Device (PSD) serial number 12. The class of mail 14 also can be obtained and used in postal authority report generation.

The postal authority reports reflect accumulatively compiled mailpiece data with respect to a mail client that is associated with each mailpiece in the mailing. The correct postage reporting to the postal authority for permit mail is made possible by the imaging reading device 220 reading the weight category 90 (FIG. 1), and using that data with the rate tables to determine the postage due for the mailpiece being processed. In addition, the weight category data 730 (FIG. 7) is printed to the left of the IMb for permit mail.

Figure 4:
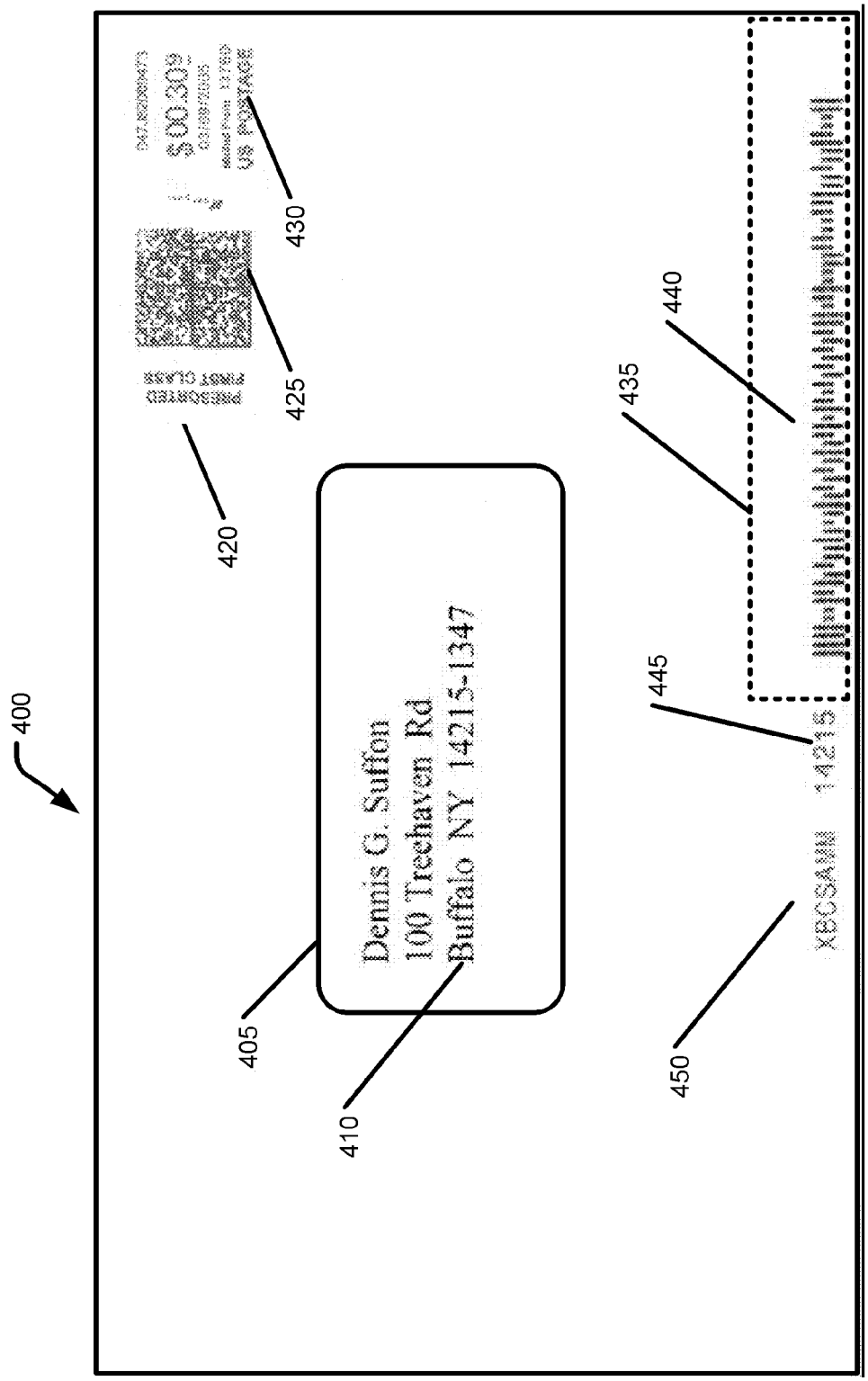
FIG. 4 is an illustration of a mailpiece processed on a sorter with an extended data IBI postage meter indicia printed on the mailpiece.
Figure 5:
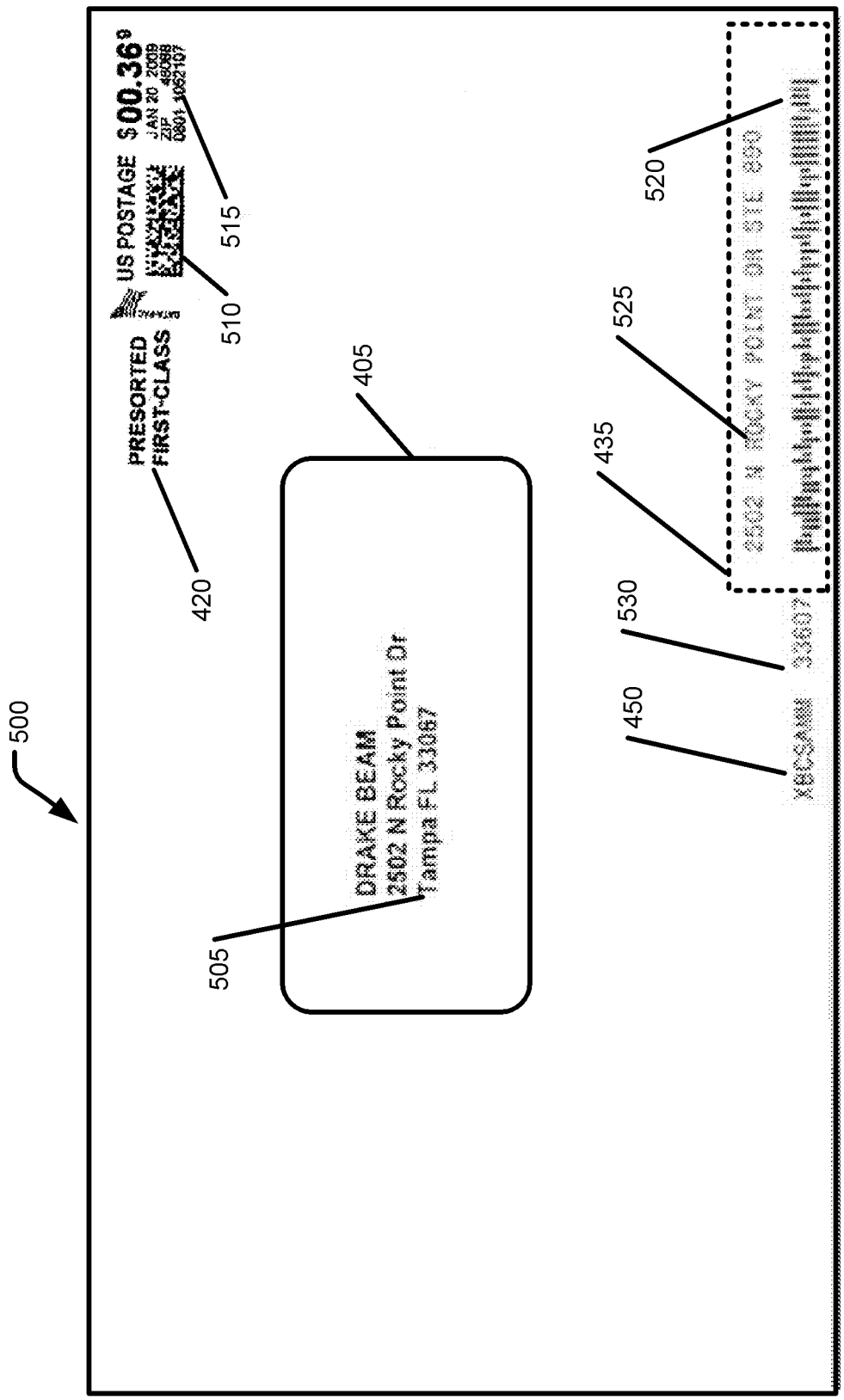
FIG. 5 is an illustration of a mailpiece processed on a sorter with a light data IBI postage meter indicia printed on the mailpiece.
Figure 7:
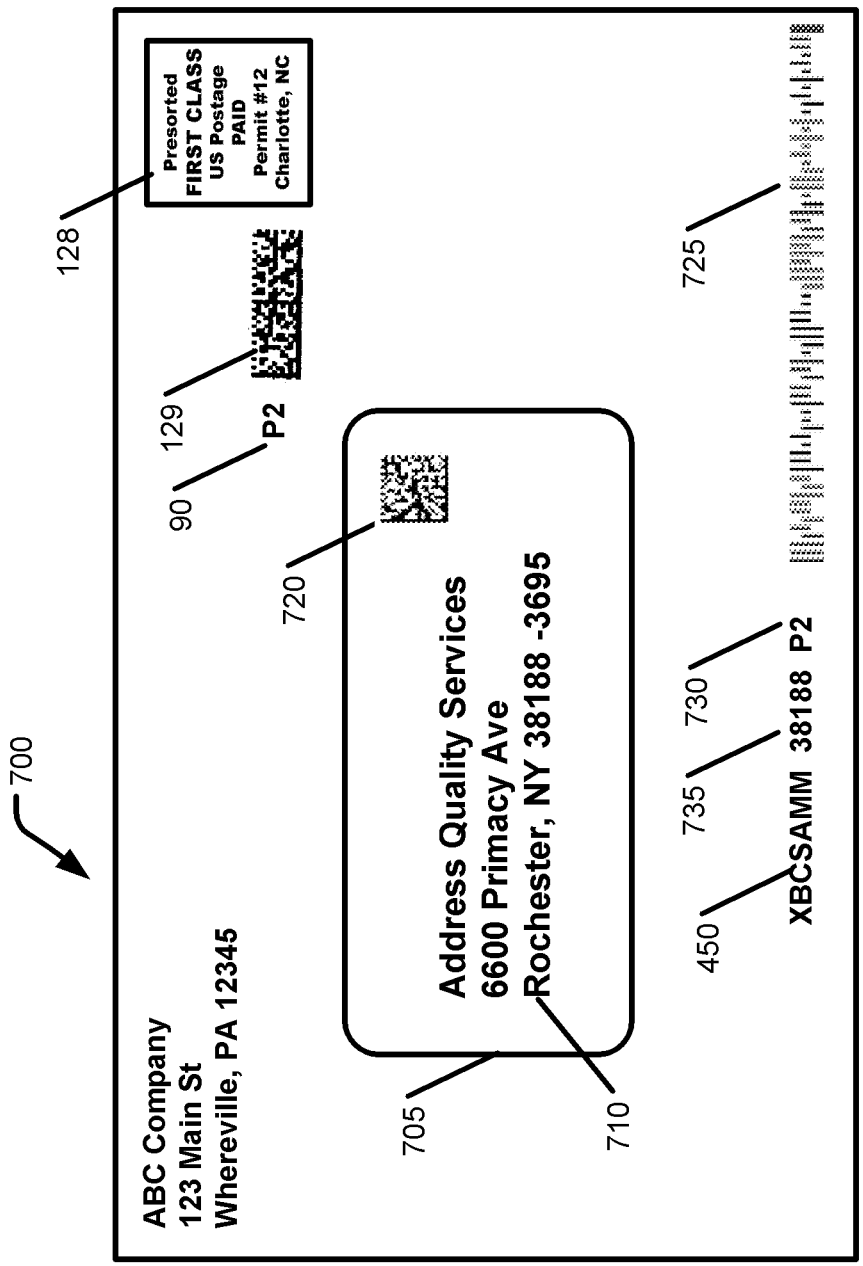
FIG. 7 is an illustration of a mailpiece processed on a sorter with an IBI and a permit imprint printed on the mailpiece.

The IBI light data files 20 are shown in FIG. 3. The combination of the piece count 10 and the PSD serial number 12 uniquely identify the mailpiece examples, which are shown in FIGS. 4, 5 and 7. Optionally, the IBI is read by a barcode reader 215 located immediately after the feeder 210. This option is required if the unique mailpiece identified in the IBI has job parameters associated with it that impact the operation of the imaging reading device 220. A typical non-limiting example would be a region of interest set around the address block window (405, 405 and 705 shown in FIGS. 4, 5 and 7, respectively). Specifying a ROI is a technique used to speed up address and addressee data reading by eliminating the need to search the whole image to find the address block.

The delivery point address code, returned from the imaging reading device 220 to the sorter computer 160, is combined with a mailer ID to format an IMb in accordance with the parameters 30 described in FIG. 3. The data 132, 134 (i.e. first parametric data) received from the postage device(s) 100, as shown in Table 1, is combined with data (also referred to as second parametric data) available to or produced by the sorter, Tables 2 and 3.

TABLE 2

Mail Piece Data

Field

SORT_DECISION_CODE
AUTOMATION_FLAG
BIN_NUMBER
PIECE_TIME
THICKNESS
PLANET_CODE
POSTNET_CODE
UNIQUE IDENTIFIER
SORT_LEVEL
ACTUAL_BIN_NUMBER
ACTUAL_WEIGHT
CB_CODE
FAST_FORWARD_HIT
BARCODED
REJECTED
DPV_FLAG
LACS_FLAG
CUSTOMER_PROFILE_NUMBER
SORTER_SERIAL_NUMBER
SORTER_SCHEME_NAME
PRINT_JOB_NAME
POSTAGE_WEIGHT
AFFIXED_RATE
CB_CODE_SECONDARY
BIN_SWITCH
READER_SW_VERSION
SCHEME_BIN_TYPE_ID
ZIP

TABLE 3

Customer Data

Field

ACCT_CUSTOMER_NUMBER
COMPANY_NAME
MAILER ID
FEDERAL_TAX_ID
CUSTOMER_STATUS
COMMENTS
PHONE_BUSINESS
PHONE_MOBILE
EMAIL

TABLE 3-continued

Customer Data

Field

SALUTATION
FIRST_NAME
MIDDLE_NAME
LAST_NAME
TO_NAME
ATTN_NAME
ADDRESS_LINE1
ADDRESSLINE2
CITY
STATE_OR_PROVINCE
POSTCODE
COUNTRY_CODE
PERMIT LIST

Tables 2 and 3 are representative of some of the data fields associated with mailpieces that are processed by the sorter control software incorporated in the sorter computer 160. Those skilled in the art will define additional data fields and categories of data types based on the sorter and sorter control software design. In order to associate Table 1 data with data from Tables 2 and 3 for each mailpiece, the IBI piece count 10 (FIG. 3) is associated with the IMb unique identifier 11 and the customer PSD serial number 12 is associated with the Mailer ID 13. The association of the unique identifiers 10, 12 in the IBI with the unique identifiers 11, 13 in the IMb enables the data (i.e. first and second parametric data) from Tables 1, 2 and 3 to be appended together for each respective mailpiece.

As a direct result of the IBI and IMb data association, the sorter operator is able to run the jobs in the job queue in any order without having to stop the sorter to end one job and start another job. This seamless operation is obtainable since the IBI unique identifier coupled with the postage meter data (Table 1) identifies the client for each mailpiece before the sorter control software has to compile the data needed for client reporting, postal authority reporting and postage accounting. Another benefit of the data association is the ability to intermix the running of trays from different jobs and still keep all the mailpiece data separated by client. Without the IBI mailpiece identification and data association, running trays of mail from different jobs in succession would result in erroneous data reporting and the inability to submit the mailing to the postal authority. The advantages achieved, for example, may include greater sorter throughput by avoiding job change over during sortation and/or reduction of serious data errors by accidentally running a tray of mail from one job with another job's mail trays. The association of the unique identifier in the IBI and the unique identifier in the IMb, both of which are associated with a client, enable tracking of the physical location of the mailpiece in the production process each time the IBI or the IMb is read. This tracking may continue through the postal delivery network every time the IMb is read by a postal mail processing system.

The delivery point address code 9 and the IMb (420, 520 and 725 FIGS. 4, 5 and 7) are compiled along with updated address data 525 (FIG. 5) during mailpiece travel time from the image reading device 220 to the printers 230. Printers 230 print the IMb, updated address data, if required, and a numeric 5 digit ZIPCODE 445, 530 plus a machine code in accordance with the format detailed in Table 4. The IMb print quality and accuracy are verified by a verifier 235 before being sorted into ZIP groups in the sort bins 165. When all jobs in a mailing have been sorted, the electronic documentation 175 is compiled and transferred to the postal authority 190. Alternately, the electronic documentation is compiled in the sorting server system 240 and transmitted to the postal authority or the electronic documentation 180 is transmitted from the data center processor 140.

An example of the IMb data structure 30 is illustrated in FIG. 3. The first data field 8 is a barcode identifier, which is two digits or more in length. The first data field 8 is reserved for future use by the postal authority. The second data field (service type identifier) 15 is three digits in length and used to identify whether address change service (ACS) is requested, or whether ACS address service and Confirm is requested. If ACS and Confirm are used, the digits 080 may be used to identify a request for ACS and the digits 140 may be used to identify the request for combined service of ACS and Confirm. Confirm is the USPS service that is used to track a mail piece through the postal network and confirm its delivery. Web based products provide the ability to track a mailpiece based on the tracking code 16 (FIG. 3) in the IMb. The Track N Trace® provided by BCC Software is an example of a product that can track a mailpiece from induction by USPS through delivery. The third data field 13 indicates a mailer identifier number ("Mailer ID"). The third data field 13 may be six or nine digits in length depending on the number of mail pieces provided to the USPS per year. High volume mailers are assigned a six digit ID, while lower volume mailers will generally have an assigned 9 digit Mailer ID. The fourth data field (unique identifier) 11 of the IMb data structure is nine digits in length for high volume mailers and six digits in length for smaller sized mailers. Various USPS requirements dictate the structure of this number. For example, if the Confirm service and ACS are selected, this field may contain a unique number which remains unique for at least 45 days, which is substantially long enough to ensure no ambiguous tracking results can occur because two mail pieces with the same Mailer ID 13, service type identifier 15 and unique identification number 11 are in the postal network at the same time. Data fields 11, 13, and 15 form the tracking code 16 that is used by USPS to track the mailpiece through the postal delivery network from induction to delivery confirmation. The fifth data field 9 is reserved for the delivery point address code (e.g., ZIPCODE) which can be 5, 9 or 11 digits in length to identify a delivery point address code. The delivery point address code 9 is provided by the image reading device 220.

FIG. 4 is an example of a mailpiece that has been processed by the sorter 150 (FIG. 1) for which the address 410 has passed the Coding Accuracy Support System (CASS) and Delivery Point Validation (DPV) quality analysis which are performed by the image reading device 220 (FIG. 2). The imaging reading device 220 acquires an image of the address from the envelope 400 or by reading the address from the contents of an insert in the envelope 400 through a window 405. The indicia 430, an extended data IBI 425 and the class of mail 420 are printed by the meter printer system 115 (FIG. 1). The sorter printer 230 (FIG. 2) is used to print the delivery point barcode (e.g. IMb) 440 within the clear zone 435 at the bottom of the envelope. The clear zone is reserved for printing postal authority delivery point barcodes and update address data if required. Immediately to the left of the barcode is a numeric printout for the 5 digit ZIPCODE 445 and the machine identifier 450. An exemplary machine code format is shown in Table 4.

TABLE 4

Machine Identifier
MACHINE IDENTIFIER (510)

| X | XXX | X | XX |
|---|---|---|---|
| Directory Date | System ID | Unique Character | Mail Type |

| | |
|---|---|
| Directory Date | The Dir. Data is passed from SABRE to Adv. Curve over the network protocol. This is an alpha character A thru L for the month and an X if the MASS test directory is loaded. |
| System ID | Assigned by USPS |
| Unique Character | This is an alpha character A-Y. It is user assigned and is used to help identify the customer |
| Mail Type | Identifies mail type. sample codes are as follows: MM - First class letters and cards - Barcoded Mixed AADC Meter Postage Affixed MM - Standard class - Barcoded Mixed AADC Meter Postage Affixed NM - Standard non-profit - Barcoded Mixed AADC Meter Postage Affixed |

FIG. 5 is an example of a mailpiece that has been processed by the sorter 150 (FIG. 1) for which the address 505 has passed the Coding Accuracy Support System (CASS) and Delivery Point Validation (DPV) quality analysis which are performed by the image reading device 220 (FIG. 2). However, in this example, a suite number was determined to be missing by SuiteLink address and addressee processing, performed by the image reading device 220. An updated address 525 is printed above the delivery point barcode 520 by printer 230 (FIG. 2). The imaging reading device 220 acquires an image of the address from the envelope 500 or by reading the address from the contents of an insert in the envelope 500 through a window 405. The indicia 430, an extended data IBI 425 and the class of mail 420 are printed by the meter printer system 115 (FIG. 1). The sorter printer 230 (FIG. 2) is used to print the delivery point barcode (e.g. IMb) 440 within the clear zone 435 at the bottom of the envelope. The clear zone is reserved for printing postal authority delivery point barcodes and update address data if required. Immediately to the left of the barcode is a numeric printout for the 5 digit ZIPCODE 530 and the machine identifier 450.

Figure 6:
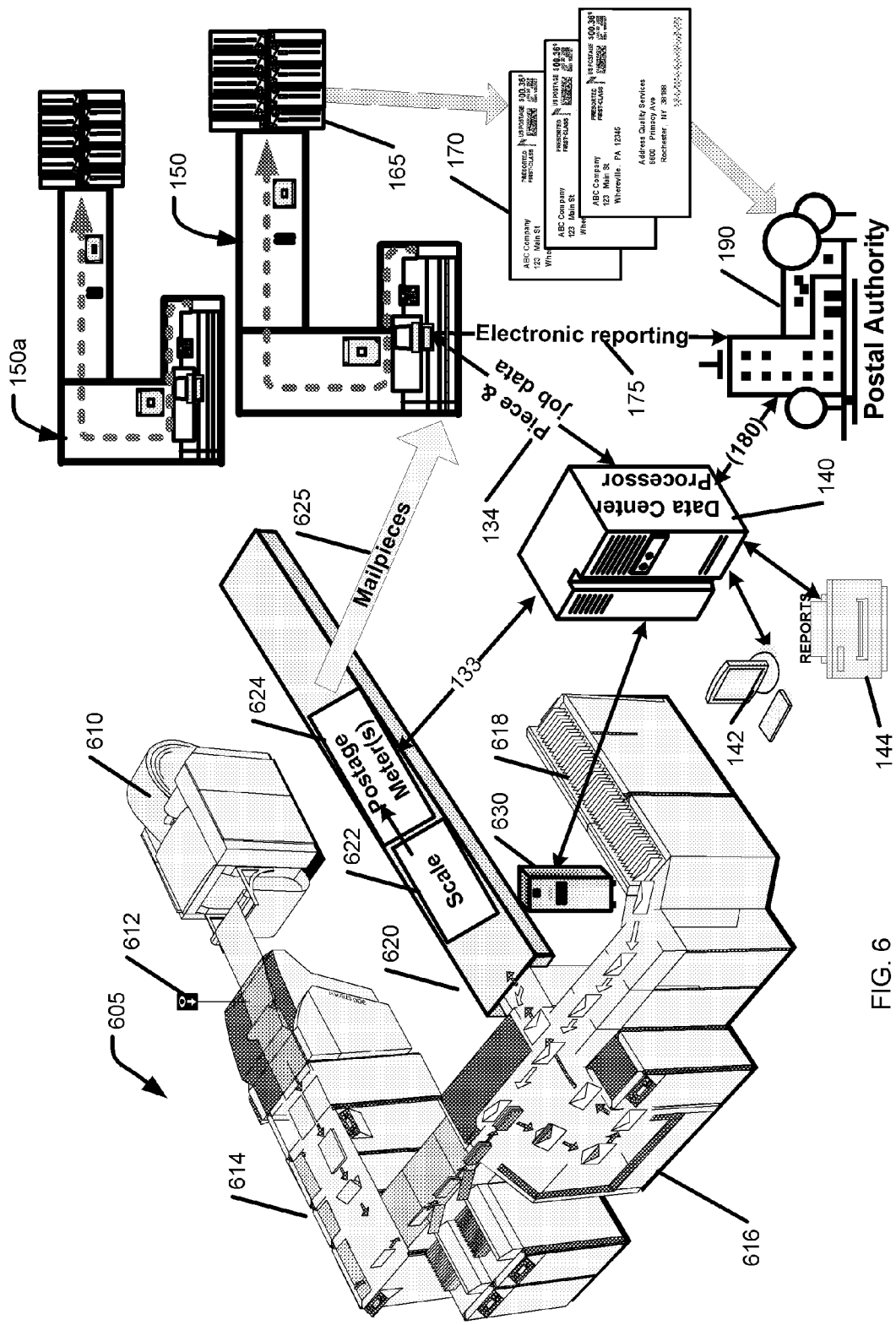
FIG. 6 is an example of a system and process to track mailpieces through an inserter and a postage meter which are then processed by a sorter.

Reference is now made to FIG. 6 for an exemplary illustration of the system and process needed to track mailpieces through an inserter 605 and postage meter(s) 624 and then processed and tracked by one or more sorters 150, 150a. The processing starts with roll of documents 610 to be inserted into envelopes 618 by an inserter 605. A barcode reader 612 is positioned on the input channel 614 to read the Inserter Data File (IDF) barcode 720 (FIG. 7). The IDF barcode either contains inserter control instructions or a reference to a file in the inserter control computer 630 that contains the instructions. Portions of the IDF file are transferred to the inserter computer 630 from the data center processor 140. In addition to instructions, the IDF file contains mailpiece item data generated during mailpiece production and is supplemented as the mailpiece is processed on the inserter 605 or was preloaded by the data center processor 140. A sample of the data contained in the IDF is shown in Table 5. The mailpiece item data generated by the inserter and preceding steps such as, but not limited to, printing and print inspection is more extensive than represented by Table 5. Those skilled in the art will appreciate that hundreds of additional data fields have been defined. This mailpiece item data will be merged in the data center processor 140 with the data from Tables 1, 2 and 3.

TABLE 5

IDF Data Records

| Field Name | Description |
| --- | --- |
| IDF name | The 8 character name of the IDF. |
| IDF Account Number | The actual record number in the IDF. The first record in the file has the number "000001". Each additional record has a number that increases by the value of 1. |
| Total Units | The total number of physical sheets in the set. Each sheet consists of 2 pages (front and back of the sheet). |
| Stream Units 1 | The number of sheets in a set which comes from stream #1. Inapplicable fields are filled with zeros. |
| Mailing Date | The processor writes the anticipated mailing date, as entered by the user (YYYYMMDD) when the job was loaded. |
| Finished Time | The processor writer the time (HHMMSS) into this field when the set exits the processor. |
| Finished Date | The processor writer the date (YYYYMMDD) into this field when the processor assembles the set. |
| Machine ID | The ID of the processor that processed the set. All inserter processors are assigned a one-character ID. |
| Machine Type | The eight-character name for the type of inserter that processed the account. |
| Shift Number | The name of the shift active when the set was processed (usually "1", "2", or "3"). |
| Job ID | The four-digit job sequence number. The number is set at the inserter, and the number for each successive job increases by 1 |
| Operator Name | The name of the operator logged on to the inserter when the set was processed |
| Weight | The calculated weight of the set, expressed in thousandths of an ounce. |
| Postage | The amount of postage calculated to be applicable for the mailpiece. |
| Host Sort Identifier | The field is used to identify mailpieces that have been sorted together to form a single mailing. |
| Mailpiece Sequence Number (50) | When paying postage with a 3600-R form supported by a manifest, each mailpiece requires a unique consecutive number within a particular host sort. |

If a sequence number 50 (Table 5) is printed on the mailpiece insert and is visible through the window 705 (FIG. 7) or the IDF barcode contains a unique identifier and is visible through the window 705, this data will be used to match mailpiece item data from the inserter to the IBI and IMb. If there is no unique identifier visible on the mailpiece, the document to be inserted will be tracked by the inserter computer 630 as the document progresses from the input channel 614 through the envelope inserter 616 to the output channel 620. When the finished mailpiece arrives at the scale 622, the associated item data is known and is correlated with the IBI printed by the postage meter 624. The scale 622 requirement is deleted if all the mailpieces are of a known identical weight or the weight has been calculated based on the known contents of the envelope. The postage meter 624 prints the postage indicia 145 (FIG. 1), the permit imprint 146 or the extended IBI 425 (FIG. 4) on each respective mailpiece. The postage meter data 133 and inserter item data are transferred to the data center processor 140, either as each mailpiece is completed or when the job is finished, by the postage meter computer 124 and the inserter control computer 630. The finished mailpieces 625 are provided to the sorter 150 along with the mailpiece item data and job data 134 as required for sorter operation in accordance with the aforementioned explanations for FIGS. 1 and 2. The sorted and barcoded mailpieces 170 are loaded into mail trays and delivered to the postal authority 190. The required electronic documentation 175 or 180 is provided by the sorter system 150 or the data center processor 140. Electronic documentation is provide to the clients based on mailpiece item data complied from data collected from the inserter 605, postage meter 624 and sorter 150. Printer 144 and operator interface 142 also may be used for reporting. In addition, both the printer 144 and the display 142 can be connected via remote access over a LAN, WAN or internet. With the addition of a barcode scanner (not shown) that can read either the IBI and/or the IMb, individual mailpiece item data can be recalled and printed or displayed.

FIG. 7 is an example of a mailpiece 700 with permit imprint 128, IBI light 129 and a weight category indication 90 applied by a postage meter system 624. The sorter 150 has printed the IMb 725, weight category 730, 5 digit ZIPCODE and machine ID 450. The addition of IBI to the permit imprint enables the advanced item tracking and data collection defined herein to be applied to a permit mailing. The resulting electronic documentation meets the requirements for a manifest and well as the individual mailpiece data needed for mailpiece quality inspection when the mailing is accepted by the postal authority.

As shown by the above discussion, functions relating to the control of a mail processing machine such as a postage meter, a mail sorter and an inserter or wrapper mailpiece production system may be implemented on one or more computers operating as the control processors 124, 160, 630 connected for data communication with the processing resource controllers 140 and 240 as shown in FIGS. 1, 2 and 6. As understood by those skilled in this art, additional processors may be used to process data and control devices are required by the computer architecture design. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming; including executable code as well as associated stored data, e.g. files used for the workflow templates for a number of production jobs as well as the various files for tracking data accumulated during one or more productions runs. The software code is executable by the general-purpose computer that functions as the control processor and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement a portion or all of the methodology for tracking a mailpiece through the steps associated with its manufacture and post processing and generating associated reports, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and, as a result, the drawings should be self-explanatory.

For example, control processor (e.g. 124, 140, 160, etc) may be a PC based implementation of a central control processing system like that of FIG. 9, or may be implemented on a platform configured as a central or host computer or server like that of FIG. 8. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer, inserter or sorter control computer may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for generating an integrated mailpiece, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps regarding the tracking and reporting of processing of mailpieces, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a central server or processor 140 into the sorter processor 160. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of processing a plurality of permit imprinted mailpieces, the method comprising steps of:
   by way of a postage device, printing an information based indicia barcode (IBI) adjacent to the permit imprint on each respective mailpiece, the information based barcode including a unique identifier for each respective mailpiece;
   obtaining parametric data for each respective mailpiece and associating the unique identifier, encoded in the IBI, and parametric data for each respective mailpiece;
   transferring the unique identifier and parametric data for each respective mailpiece from the postage device to a sorter;
   during sorting on the sorter, reading each unique identifier from the information based barcode printed on each respective mailpiece; and
   using the read unique identifier and transferred parametric data for each respective mailpiece to control at least one aspect of sorter operation.

2. The method of claim 1, further comprising the step of: printing the information based barcode adjacent to a permit imprint on each respective mailpiece.

3. The method of claim 1, further comprising the step of: printing weight category information adjacent to a permit imprint on each respective mailpiece.

4. The method of claim 1, wherein the reading step includes:
   reading each unique identifier by way of an image reading device.

5. The method of claim 1, wherein the postage device is selected from a postage meter device or a permit imprint device.

6. The method of claim 1, wherein the IBI is defined by United States Postal Service (USPS).

7. The method of claim 6, wherein the sorter is configured to run a job containing the plurality of permit imprinted mailpieces in any order without having to stop the sorter to end one job and start another job based on an association between the IBI barcode and postage meter data identifying a client for each of the mailpieces.

8. The method of claim 1, wherein the unique identifier encoded in the IBI is selected from a combination of a mailpiece count and/or postal security device (PSD) serial number.

9. The method of claim 1, further comprising the step of:
   generating a postal authority report and/or client report including the associated parametric data and unique identifier for each mailpiece.

10. The method of claim 1, wherein the read unique identifier and parametric data for each respective mailpiece allows tracking of each mailpiece during sorting on the sorter.

11. The method of claim 1, further comprising the step of:
    associating the unique identifier and parametric data for each respective mailpiece with a delivery point barcode printed on each mailpiece, the delivery point barcode containing a second unique identifier and second parametric data for each respective mailpiece.

12. The method of claim 11, wherein the delivery point barcode is an Intelligent Mail barcode (IMb) as defined by the USPS.

13. The method of claim 11, wherein the second parametric data is associated with the sorting operation and the second unique identifier contained in the delivery point barcode.

14. The method of claim 11, wherein the data for postal authority and/or client processing reports are drawn from first and second parametric data sets which are associated together by the sorting system control processor by associating the first and second unique identifiers together for each mail piece.

15. The method of claim 1, wherein the collection of data associated with the unique identifier obtained from the IBI adjacent to the permit imprint is used by the sorter to associate parameters needed for sorter operation, the associated parameters selected from at least one of: mailer ID, client ID, job ID, weight, postage applied, permit number, mailpiece count for inclusion in postal authority and/or client processing reports.

16. The method of claim 15, wherein the postal authority and/or client report are selected from at least one of: a postage summary report, mail makeup report, postage accounting by permit number, permit mail manifest, and job break down by client.

17. The method of claim 1, wherein the parametric data associated with the unique identifier is a combination of parameters associated with the postage device and an inserter.

18. The method of claim 1, wherein the postage device prints a permit imprint if no postage evidencing (permit imprint or meter indicium) is present.

19. Non-transitory computer readable medium having executable instructions stored thereon, which when executed by a computer cause the computer to perform the steps of claim 1.

* * * * *